3,470,264
SEPARATION OF ALUMINUM HALIDE COMPLEX IN ALKYLATION PROCESS
Luther F. Mayhue, Bartlesville, Okla., assignor to Phillips Petroleum Company, a corporation of Delaware
Filed Mar. 27, 1967, Ser. No. 626,159
Int. Cl. C07c *3/56, 7/00*
U.S. Cl. 260—683.57                    7 Claims

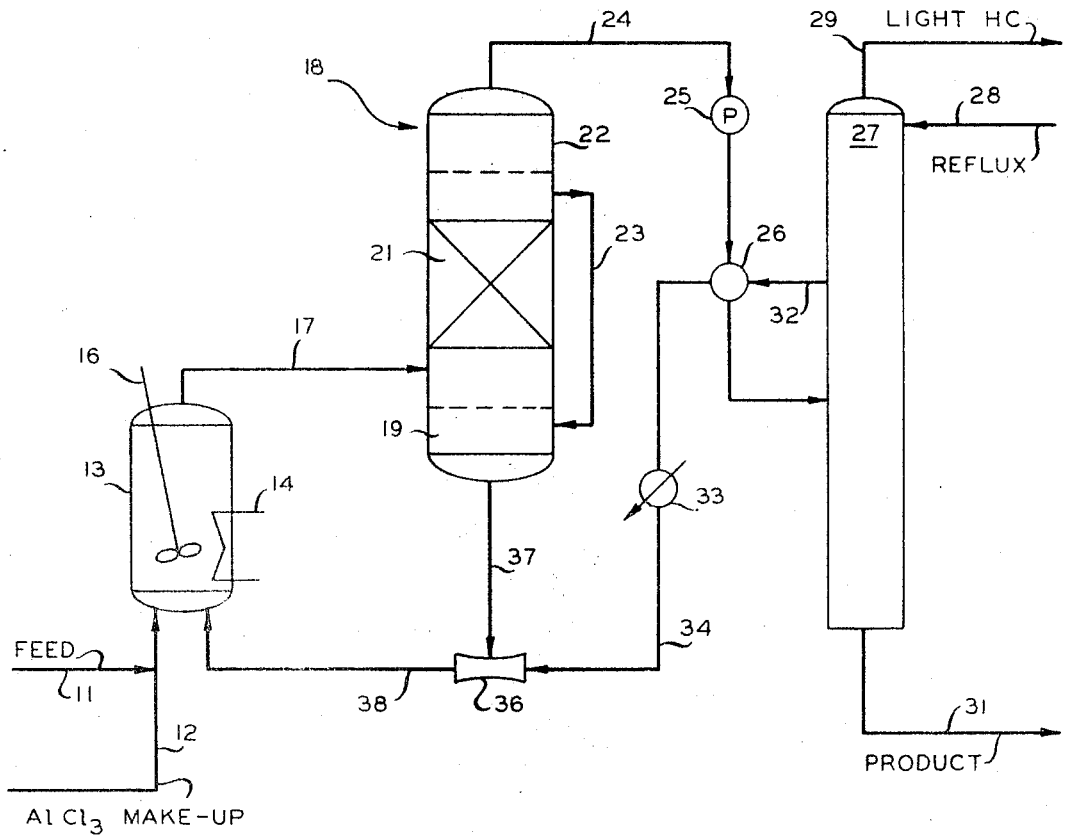

ABSTRACT OF THE DISCLOSURE

Hydrocarbon effluent containing aluminum halide catalyst is passed from an alkylation reaction into the lower zone of a settler-accumulator-coalescer vessel, the effluent is separated in the lower zone into a heavy liquid phase of aluminum halide complex and a light liquid hydrocarbon phase with entrained aluminum halide complex. The light liquid hydrocarbon phase is passed through the coalescing zone to an upper zone in said vessel, where further separation of the hydrocarbon and the aluminum halide catalyst complex takes place. The alkylation product recovered from the hydrocarbon is substantially free of aluminum halide catalyst.

---

This invention relates to catalyst separation and recovery in a hydrocarbon conversion process. In one aspect it relates to a process for producing diisopropyl by alkylation of isobutane with ethylene utilizing aluminum chloride catalyst.

Hydrocarbon conversion processes such as alkylation of alkylatable hydrocarbons with olefins employing aluminum halide catalyst are known. In the past the hydrocarbon-aluminum halide complex catalyst has been removed from the reaction vessel and passed to a first settling vessel wherein a major portion of the catalyst was separated and removed. The remaining hydrocarbon phase containing residual catalyst was then passed to a second separation vessel, preferably a packed-coalescing tower, to produce catalyst free hydrocarbon. However, problems have been incurred in that the coalescer bed volume utilized in the prior operations has greatly reduced the flow rate of the hydrocarbon through the bed which is undesirable. We have now discovered a process wherein the need for separate settler and coalescer vessels has been eliminated, thereby eliminating many controls and auxiliary units as well as providing a process wherein the hydyrocarbon flow rate through the coalescer bed is greatly increased, thereby allowing greater throughput for the same amount of coalescing material.

An object of this invention is to provide an improved process for catalytic conversion of a hydrocarbon.

Another object of this invention is to provide an improved process for catalyst separation and recovery in a hydrocarbon conversion process.

Another object of this invention is to provide an improved process for the separation of the aluminum halide catalyst phase from the hydrocarbon phase following an alkylation reaction.

These and other objects of the invention will become more readily apparent from the following detailed description and discussion.

The foregoing objects are realized broadly by charging the reactor effluent into the lower section of a settler-accumulator-coalescer which has a packing material in the section above the hydrocarbon-catalyst complex interface. The product hydrocarbon is removed from the settler-accumulator-coalescer as an overhead stream, and the coalesced aluminum halide catalyst complex is recovered from the unit above the packing and is transferred to the lower zone of the unit containing the separated catalyst complex. The catalyst material is then removed from the lower section by eduction using recycle hydrocarbon to power the eductor, with recycling of the catalyst to the reactor. The aluminum halide catalysts used according to the present invention are selected from the group consisting of aluminum chloride and aluminum bromide.

In the drawing, the figure is a schematic of the apparatus for the production of diisopropyl, 2,3-dimethylbutane, according to the present invention.

Referring to the drawing, a hydrocarbon feed comprising ethylene and isobutane is introduced into reactor 13 via conduit 11. A catalyst complex of aluminum chloride and hydrocarbon is prepared and introduced into reactor 13 via conduit 12. Reactor 13 is provided with a cooling coil 14 and a stirrer 16. The hydrocarbon feed and aluminum chloride catalyst complex are thoroughly agitated for a contact period of about 3 to 10 minutes within reactor 13 to form a hydrocarbon-aluminum chloride complex emulsion which is maintained at a temperature within the range of 120 to 140° F. and at a pressure within the range of about 150 to 175 p.s.i.a. The hydrocarbon to catalyst volume ratio is within the range of about 1:1 to 1:3. The hydrocarbon-aluminum chloride complex emulsion is withdrawn from reactor 13 via conduit 17 and passed to settler-accumulator-coalescer 18.

Settler-accumulator-coalescer 18, maintained at a temperature in the range of about 120 to 140° F., and a pressure in the range of about 140 to 160 p.s.i.a., is shown having three zones, a lower zone 19, a coalescing zone 21, and an upper zone 22. As the reactor effluent from reactor 13 is introduced into the lower zone 19 of settler-accumulator-coalescer 18 the effluent separates into a light liquid phase containing the hydrocarbon and entrained aluminum chloride complex and a heavy liquid phase of aluminum chloride complex catalyst. The hydrocarbon phase containing entrained aluminum chloride complex is passed through the coalescing zone. The coalescing zone is packed with contact material such as ceramic, raschig rings, bauxite, activated carbon, and other appropriate coalescing agents. The rate of flow upward of the hydrocarbon phase is increased due to a decrease in flow area occupied by the packing. After passing through the coalescing zone, the stream velocity decreases due to increase in flow area now void of packing, and the hydrocarbon is separated from substantially all the entrained aluminum chloride complex, forming a hydrocarbon phase and an aluminum chloride catalyst complex phase. Due to the decrease in flow rate of the effluent leaving the coalescing zone, separation of the hydrocarbon and the aluminum chloride catalyst in upper compartment 22 is greatly facilitated.

The rate of flow through the packed zone, coalescing zone 21, is about 10 to 15 gallons per minute per square foot of bed area (normal to the flow). This velocity decreases above the top of the packed bed. The result is that a layer of separated catalyst complex is maintained at the top of the bed as the downward flow through the bed is counterbalanced by the upward velocity of the hydrocarbon and entrained aluminum chloride catalyst complex through the bed.

The hydrocarbon phase separates as the upper phase in the upper compartment and substantially all of the coalesced aluminum chloride complex catalyst is removed and contained in the lower phase of the upper compartment. The lower phase, the coalesced aluminum chloride catalyst complex phase, is withdrawn from upper zone 22 via conduit 23 and returned by gravity flow to lower compartment 19. The hydrocarbon phase, with substantially all of the aluminum chloride complex catalyst removed, is withdrawn from upper compartment 22 of settler-accumulator-coalescer 18 via conduit 24 and passed through pump 25 to increase the pressure of the hydrocarbon as it flows through indirect heat exchanger 26 and into fractionator 27. Due to the fractionator 27 being operated at higher temperatures and pressures than settler-accumulator-coalescer 18 it is necessary to employ a pumping means, such as pump 25, with conduit 24 in order to transfer the overhead product from settler-accumulator-coalescer 18 to fractionator 27.

Fractionator 27 is provided with reboiler means and a reflux which is introduced into fractionator 27 via conduit 28. Fractionator 27 is operated at a pressure in the range of about 275 to 325 p.s.i.a., a top temperature of about 130 to 150° F., and a bottom temperature of about 200 to 300° F. The light hydrocarbons, the $C_3$, $C_2$, i.e. propane, ethane, and any unreacted ethylene, are removed from fractionator 27 as overhead via conduit 29 for further processing as desired. The product, containing the high octane diisopropyl alkylate, is removed from fractionator 27 via conduit 31. The product diisopropyl withdrawn from fractionator 27 via conduit 31 can be passed to a fractionator zone (not shown) for removal of n-butane. The alkylate can be caustic washed (not shown) if desired.

Isobutane removed from the hydrocarbon introduced into fractionator 27 is withdrawn from fractionator 27 via conduit 32 and is passed to indirect heat exchanger 26 and to cooler 33. The isobutane is then withdrawn from cooler 33 via conduit 34 and passed to eductor 36. Such an eductor is known in the art. As the isobutane passes through eductor 36, the isobutane powers eductor 36 thereby causing aluminum chloride complex to be removed from lower zone 19 of settler-accumulator-coalescer 18 via conduit 37 as the resulting aluminum chloride catalyst complex and isobutane mixture is recycled via conduit 38 to reactor 13. Sufficient isobutane is recycled to reactor 13 to maintain an isobutane to ethylene mol ratio of about 5:1 to 15:1.

The following tabulated data are presented as illustrative of a preferred embodiment of the process of the invention but should in no way be understood to limit the invention.

POUNDS MOLS PER HOUR

| Stream | Fresh feed (11) | Reactor effluent (17) | Coalesced complex (23) | Hydrocarbon effluent (24) | Light hydrocarbons [1] (29) | Total alkylate (31) | Recycle isobutane (32) |
|---|---|---|---|---|---|---|---|
| Component: | | | | | | | |
| Ethylene | 603 | | | | | | |
| Ethane | 2 | 2 | | 2 | 2 | | |
| Propane | 16 | 92 | | 92 | 16 | | 76 |
| Isobutane | 567 | 4,212 | | 4,212 | | 1 | 4,211 |
| Normal butane | 18 | 1,077 | | 1,077 | | 18 | 1,059 |
| Alkylate | | 877 | | 877 | | 561 | 316 |
| Hydrocarbon | | | | | | | |
| Total | 1,206 | 6,260 | | 6,260 | 18 | 580 | 5,662 |
| Catalyst lb./hr. | | 2×10⁶ | 3000 | Trace | | Trace | |

[1] Does not include reflux.

| | Range | Specific example |
|---|---|---|
| Reactor (13): | | |
| Temperature, °F | 120–140 | 130 |
| Pressure, p.s.i.a. | 150–175 | 165 |
| Hydrocarbon/catalyst volume ratio | 1:1–1:3 | 1:2 |
| Contact time, minutes | 3–10 | 5 |
| Isobutane/olefin mol ratio | 5:1–15:1 | 10:1 |
| Settler-coalescer (18): | | |
| Temperature, °F | 120–140 | 130 |
| Pressure, p.s.i.a. | 140–160 | 150 |
| Hydrocarbon velocity, gallons per minute per sq. ft. of bed area | 10–15 | 12 |
| Fractionator (27): | | |
| Pressure, p.s.i.a. | 275–325 | 300 |
| Temperature top, °F | 130–150 | 140 |
| Temperature bottom, °F | 200–300 | 240 |

Various modifications and alterations of the invention will become apparent to those skilled in the art without departing from the scope and spirit of this invention, and it should be understood that this invention is not to be limited unduly to that set forth herein for illustrative purposes. For example the process of the present invention can be employed for the removal of the aluminum halide type catalyst where normal paraffin hydrocarbons, such as n-butane, are isomerized to isoparaffins.

What is claimed is:

1. In an alkylation reaction wherein there is produced a hydrocarbon effluent containing aluminum halide catalyst the improvement comprising introducing said effluent into the lower zone of a settler-accumulator-coalescer, said settler-accumulator-coalescer having a packing material in a coalescing zone between said lower zone and an upper zone, said effluent separating in said lower zone into a light liquid phase containing hydrocarbon and entrained aluminum halide catalyst complex and a heavy liquid phase of aluminum halide complex catalyst; withdrawing said heavy phase and passing only said light liquid phase through said coalescing zone forming in said upper zone an upper hydrocarbon phase and a lower aluminum halide catalyst complex phase; and separately withdrawing said hydrocarbon phase and said complex phase from the upper zone of said settler-accumulator-coalescer, and passing said hydrocarbon phase to a fractionator wherein an alkylation product substantially free of aluminum halide catalyst is recovered.

2. A process according to claim 1 wherein said aluminum halide is selected from the group consisting of aluminum chloride and aluminum bromide.

3. A process according to claim 1 wherein the aluminum halide catalyst complex phase in said upper zone is recycled to said lower zone of said settler-accumulator-coalescer.

4. A process according to claim 1 wherein said aluminum halide catalyst complex is continuously withdrawn from said lower zone of said settler-accumulator-coalescer and recycled to said alkylation reaction.

5. A process according to claim 3 wherein hydrocarbon is withdrawn from said fractionator and passed through a heat exchanger, a cooler, and an eductor, said hydrocarbon powering an eductor thereby causing aluminum halide catalyst complex to be removed from the lower zone of said settler-accumulator-coalescer and recycling said catalyst complex and said hydrocarbon to said reaction.

6. A process according to claim 1 wherein said settler-accumulator-coalescer is maintained at a temperature within the range of about 120 to 140° F., a pressure of about 140 to 160 p.s.i.a., and said hydrocarbon flow rate passing through said coalescing zone of said settler-accumulator-coalescer is within the range of about 10 to 15 gallons per minute per square foot of bed area.

7. The process according to claim 1 wherein said process is a process for producing diisopropyl by introducing isobutane, ethylene, and aluminum chloride catalyst to an alkylation reactor.

References Cited

UNITED STATES PATENTS

| 2,859,260 | 11/1958 | Stiles | 260—683.57 |
| 3,043,771 | 7/1962 | Bloch | 260—683.74 |
| 3,271,467 | 9/1966 | Nakayama | 260—683.74 |
| 3,342,885 | 9/1967 | Hutson | 260—683.74 |

DELBERT E. GANTZ, Primary Examiner

G. J. CRASANAKIS, Assistant Examiner

UNITED STATES PATENT OFFICE
CERTIFICATE OF CORRECTION

Patent No. 3,470,264                        September 30, 1969

Luther F. Mayhue

It is certified that error appears in the above identified patent and that said Letters Patent are hereby corrected as shown below:

Column 4, line 13, after "zone", first occurrence, insert -- to said upper zone --.

Signed and sealed this 17th day of February 1970.

(SEAL)
Attest:

Edward M. Fletcher, Jr.                WILLIAM E. SCHUYLER, JR.

Attesting Officer                          Commissioner of Patents